United States Patent [19]
Jeong

[11] Patent Number: 5,745,191
[45] Date of Patent: Apr. 28, 1998

[54] SWITCHING DEGAUSSING CIRCUIT FOR TELEVISION SET

[75] Inventor: Ha Joo Jeong, Kyungsangbook-Do, Rep. of Korea

[73] Assignee: LG Electronics Inc., Rep. of Korea

[21] Appl. No.: 583,984

[22] Filed: Jan. 11, 1996

[30] Foreign Application Priority Data

Jan. 19, 1905 [KR] Rep. of Korea ............ 386/1995

[51] Int. Cl.$^6$ .................................................. H04N 9/29
[52] U.S. Cl. ................................ 348/725; 315/8; 361/150
[58] Field of Search .......................... 348/725, 820; 361/149, 150, 151, 267; 315/8; H04N 9/29

[56] References Cited

U.S. PATENT DOCUMENTS

| | | | |
|---|---|---|---|
| 4,489,253 | 12/1984 | Godawski | 315/8 |
| 5,170,096 | 12/1992 | Kang et al. | 315/8 |
| 5,475,283 | 12/1995 | Yoshida | 315/8 |

*Primary Examiner*—John K. Peng
*Assistant Examiner*—Nathan J. Flynn
*Attorney, Agent, or Firm*—Ostrolenk, Faber, Gerb & Soffen, LLP

[57] ABSTRACT

An improved degaussing circuit for a television set capable of preventing color blurring phenomenon and picture quality deterioration by degaussing television set of which its picture quality is affected by an external magnetic field at the time of turning on and turning off the television set, which includes an LC oscillating circuit for receiving a first direct current voltage and for flowing a degaussing current; a switching unit sequentially turned on in accordance with a turning on/off operation of a television set for enabling an oscillating operation of the LC oscillating circuit; a first trigger circuit for receiving a second direct current voltage and for enabling the LC oscillating circuit by turning on the switching unit after a certain time is lapsed after the television set is turned on; a second trigger circuit for receiving a second direct current voltage for turning off the switching unit when the LC oscillating circuit completes the degaussing operation in accordance with a control of the first trigger circuit when the television set is turned on; and a third trigger circuit for receiving a third direct current voltage and for turning on the switching unit when the television set is turned off, the third trigger circuit being blocked when the television set is turned on, thus preventing color blurring of picture by sequentially degaussing after the television set is turned on, thus improving the picture quality.

5 Claims, 2 Drawing Sheets

SWITCHING DEGAUSSING CIRCUIT FOR TELEVISION SET

BACKGROUND OF THE INVENTION

1. Field of the Invention

The present invention relates to a degaussing circuit for a television set, and in particular to an improved degaussing circuit for a television set capable of preventing color blurring and picture quality deterioration by degaussing the television set the picture quality of which is affected by an external magnetic field at the time of turning on and turning off the television set.

2. Description of the Conventional Art

FIG. 1 shows a conventional degaussing circuit for a television set, which is operated when the television set is turned on, which includes an LC oscillating circuit 1 for outputting a degaussing current, a switching unit Q0 for oscillating the LC oscillating circuit 1 when the television set is turned on, and a trigger circuit 2 for turning on the switching unit Q0 and the LC oscillating circuit 1 after a certain time has lapsed from the turning-on of the television set.

The LC oscillating circuit 1 includes a diode D1, and capacitor C1 and a degaussing coil L1 which are connected in parallel with the diode D1.

The trigger circuit 2 includes resistors R2 through R6, a capacitor C2, a transistor Q1, and a zener diode ZD1.

The operation of the conventional degaussing circuit for a television set will now be explained.

When the television set is turned on, a direct current voltage B1+ from a flyback transformer is charged in the capacitor C1 of the LC oscillating circuit 1 through the resistor R1, and a direct current voltage B2+ of 12V from the flyback transformer is applied to the trigger circuit 2.

The direct current voltage B2+ of 12V is applied to the emitter of the transistor Q1 of the trigger circuit 2 through the resistor R6, and the bias voltage between the base and the emitter of the transistor Q1 is set by the capacitor C2 and the resistor R4 to be larger than the zener voltage +0.7V of the zener diode Zd1.

Therefore, when the transistor Q1 is turned off, the capacitor C1 is charged by the direct current voltage B2+, and the transistor Q1 remains turned-off until the charging level of the capacitor C2 reaches the turning-on level of the transistor Q1, and the trigger voltage is not applied to the gate of the switching unit Q0. Therefore, while the capacitor C2 is charged to the turning-on level of the transistor Q1, the switching unit Q0 is turned off. At this time, the capacitor C1 of the LC oscillating circuit 1 is charged by the direct current voltage B2+.

When the transistor Q1 is turned on in accordance with the voltage charged in the capacitor C2, the switching unit Q0 is turned in accordance with a discharge of the voltage charged in the capacitor C1, and the degaussing current i1 from the degaussing coil L1 is applied to the ground of the switching unit Q0 through the capacitor C1. In addition, the capacitor C1 is charged in the reverse direction by the degaussing current i1, and when the charging is completed the degaussing current i2 which is reverse to the degaussing direction of the degaussing current i1 is applied to the ground of the degaussing coil L1 through the diode D1 and the capacitor C1.

That is, in accordance with a charging/discharging operation of the capacitor C1, since the degaussing current i1 and i2 which are gradually decreased in accordance with an internal resistance of the degaussing coil L1 are alternately generated in the system, the television set is degaussed.

After the degaussing operation is completed, the switching unit Q0 maintains a turned-on state, and the direct current voltage B1+ of 180V is applied to the ground of the switching unit Q0, and the capacitor C1 is not charged. Therefore, when the power is not supplied to the system, the capacitor C2 is discharged, and the television set is turned on, the degaussing is performed again. Here, in case that the power is supplied to the system in a state that the capacitor C2 is not fully discharged, a time delay for charging the capacitor C1 doe not occur, the desired degaussing is not obtained.

However, in case that the conventional degaussing circuit is adapted for use with portable television set of a vehicle, when after the power is supplied to the system and the vehicle moves, the picture color blurring phenomenon may occur. In order to overcome the above-mentioned color blurring problems, a use has to turn on the television set after 30 seconds or after a one minute lapse after turning off the television set, for which the capacitor C2 is fully discharged to turn off the transistor Q1.

Therefore, the above-mentioned conventional degaussing circuit is inconvenient because it requires a relatively long time for proper use. In addition, after degaussing is performed, the current B1+ is applied to the resistor R1, which heats the resistor R1 and wastes electrical energy.

Next, FIG. 2 shows a conventional degaussing circuit for a television set, which is operated when the television set is turned off, which includes an LC oscillating circuit 1 for outputting degaussing current, a switching unit Q0 for enabling the LC oscillating circuit 1 when the television set is turned off, and a trigger circuit 3 for enabling the LC oscillating circuit 1 by turning on the switching unit Q0 for a predetermined time when the television set is turned off.

The trigger circuit 3 includes resistors R7 through R11, a capacitor C3, and a transistor Q2, and a zener diode ZD2.

The operation of the conventional degaussing circuit for a television set will now be explained.

When the television set is turned on, the capacitor C1 of the capacitor C1 is charged by the direct voltage B1+ of 180V applied thereto through the resistor R1, and a direct current voltage of 12V is applied to the trigger circuit 3.

The direct current voltage B2+ applied to the trigger circuit 3 is divided by the resistors R9, R10 and R11 and the zener diode ZD1, and the thusly divided voltage is applied to the transistor Q2 as a bias voltage. At this time, when the bias voltage is set to be lower than the turn-on voltage of the transistor Q2, and the transistor Q2 maintains a turned-off state when the television set is turned on, and the capacitor C3 is charged.

As described above, when the transistor Q2 is turned off, the switching unit Q0 is applied with the trigger voltage and maintains a turned-off state, and as shown in FIG. 1, the capacitor C1 is charged.

However, when the television set is turned off, since the component of the direct current voltage B2+ is removed, and the base voltage level of the transistor Q2 is decreased, the transistor Q2 is turned on in accordance with a voltage charged in the capacitor C3, and the trigger voltage divided by the resistors R7 and R8 is applied to the switching unit Q0, and the switching unit Q0 is turned on.

When the television set is turned off, and the switching unit Q0 is turned on, the capacitor C1 is discharged, and the degaussing current i3 is applied to the ground of the switching unit Q0 through the capacitor C1 from the degaussing coil L1. In addition, the capacitor C1 is charged in the reverse direction in accordance with the degaussing current i3. When the charging is completed, the degaussing current i4 which is reverse to the degaussing direction of the degaussing current i3 is applied to the ground of the degaussing coil L1 through the diode D1 and the capacitor C1.

That is, the degaussing current i3 and i4 which are gradually decreased by internal resistance of the degaussing coil L1 are alternately applied in accordance with a charging/discharging of the capacitor C1, so that the television set is degaussed.

However, when the television set is first turned on, the degaussing is not performed thus causing color blurring. In order to remove the color blurring, the power should be supplied to the system for a certain time until the capacitor C1 is substantially charged. Thereafter, the power is not supplied to the system for generating degaussing current, and the power is supplied to the system again after the degaussing operation performed.

Therefore, when the power is not supplied to the system, the user should wait for a long time causing inconvenience. In addition, the turning-on and turning-off are disadvantageously necessary for the desired degaussing operation.

SUMMARY OF THE INVENTION

Accordingly, it is an object of the present invention to provide a degaussing circuit for a television set, which overcome the problems encountered in a conventional degaussing circuit for a television set.

It is another object of the present invention to provide an improved degaussing circuit for a television set capable of preventing color blurring phenomenon and picture quality deteriorating by degaussing television set of which its picture quality is affected by an external magnetic field at the time of turning on and turning off the television set.

To achieve the above objects, there is provided a degaussing circuit for a television set, which includes an LC oscillating circuit for receiving a first direct current voltage and for flowing a degaussing current; a switching unit sequentially turned on in accordance with a turning on/off operation of a television set for enabling an oscillating operation of the LC oscillating circuit; a first trigger circuit for receiving a second direct current voltage and for enabling the LC oscillating circuit by turning on the switching unit after a certain time is lapsed after the television set is turned on; a second trigger circuit for receiving a second direct current voltage for turning off the switching unit when the LC oscillating circuit completes the degaussing operation in accordance with a control of the first trigger circuit when the television set is turned on; and a third trigger circuit for receiving a third direct current voltage and for turning on the switching unit when the television set is turned off, the third trigger circuit being blocked when the television set is turned on, thus preventing color blurring of picture by sequentially degaussing after the television set is turned on, thus improving the picture quality.

BRIEF DESCRIPTION OF THE DRAWINGS

FIG. 1 is a circuit view of a conventional degaussing circuit for a television set, which is operated when the power of the television set is turned on.

FIG. 4A is a wave form of a voltage charged in a capacitor of an LC oscillating circuit of FIG. 3 according to the present invention.

FIG. 4B is a wave form of a gate voltage of a switching unit of FIG. 3 according to the present invention.

DETAILED DESCRIPTION OF THE INVENTION

Figure 1:
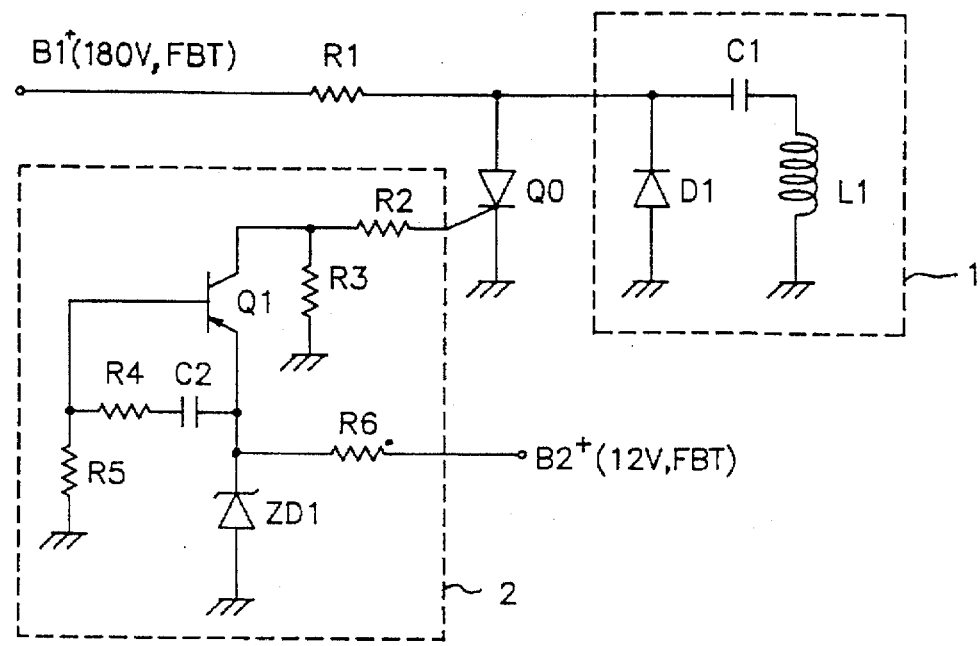
Figure 2:
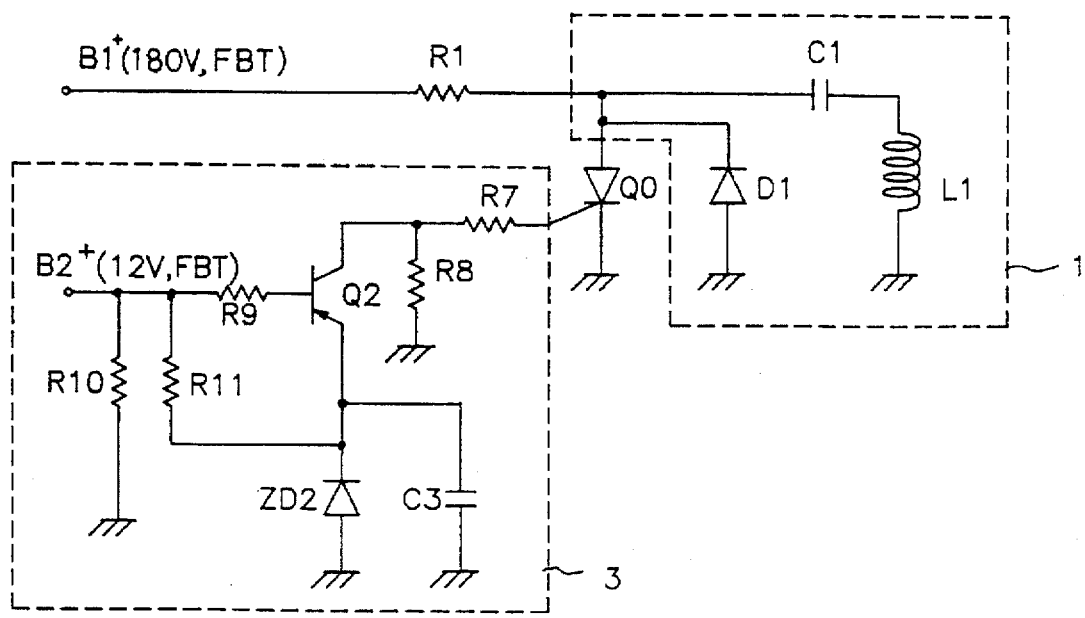
FIG. 2 is a circuit view of a conventional degaussing circuit for a television set, which is operated when the power of the television set is turned off.
Figure 3:
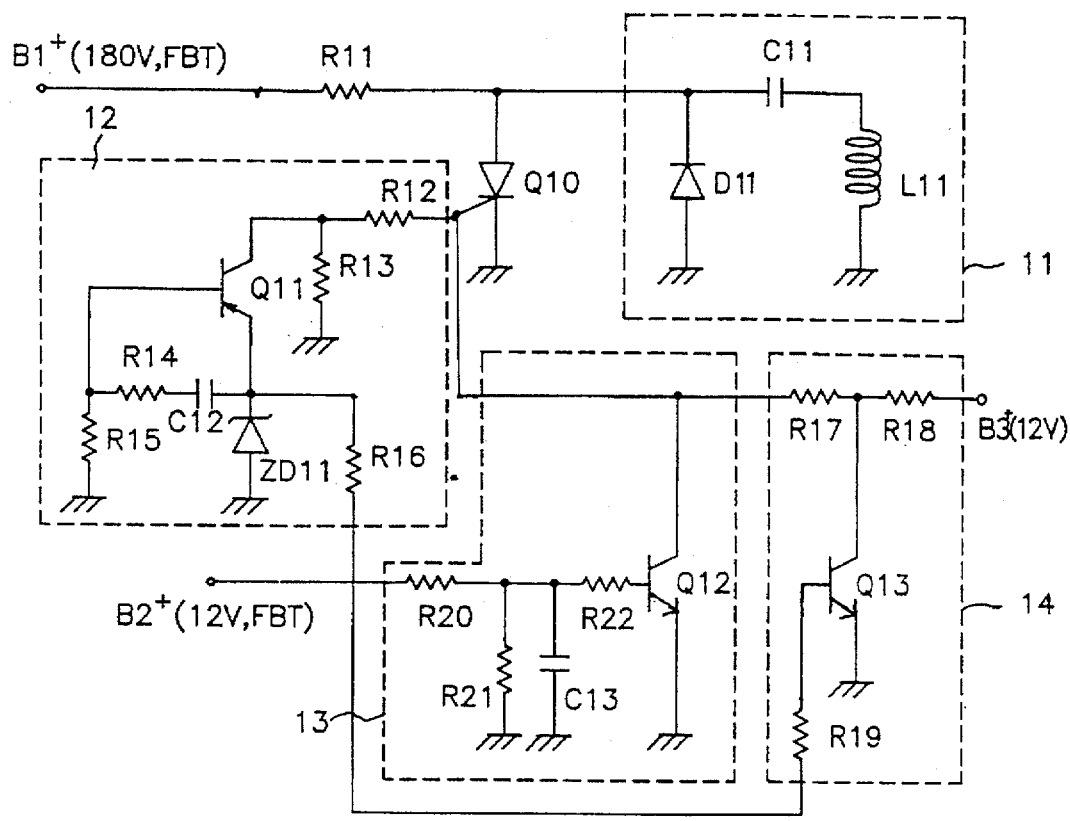
FIG. 3 is a circuit view of a degaussing circuit for a television set according to the present invention.
Figure 3:
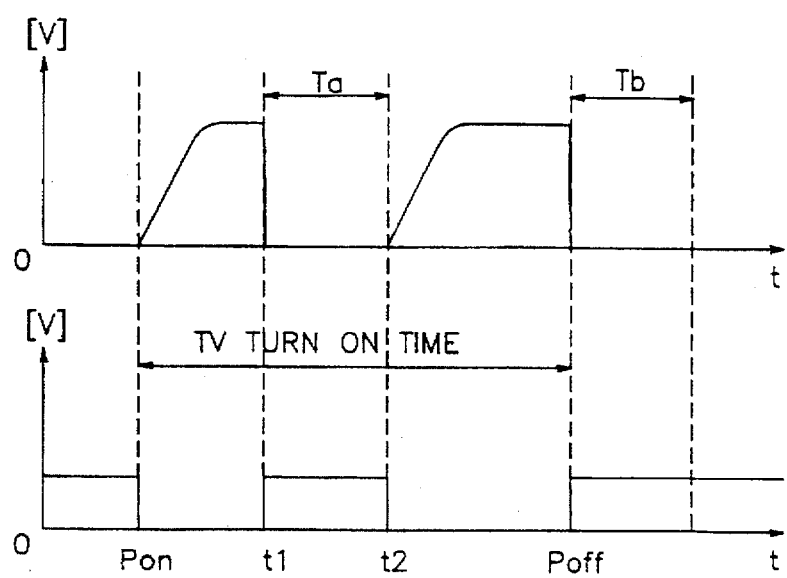

FIG. 3 shows a degaussing circuit for a television set according to the present invention, which includes an LC oscillating circuit 11 fore outputting degaussing current, a switching unit Q10 turned on in accordance with a turning-on and turning-off operation of the television set for enabling an oscillating operation of the LC oscillating circuit 11, and a first trigger circuit 12 for enabling the LC oscillating circuit 11 by turning on the switching unit Q10 after a certain time is lapsed after the television set is turned on. Also included is a second trigger circuit 13 for turning off the switching unit Q10 when the degaussing operation of the LC oscillating circuit 11 is completed in accordance with a control of the first trigger circuit 12 when the television set is turned on, and a third trigger circuit 14 for turning on the switching unit Q10, when the television set is turned off and for turning on the switching unit Q10 when the television set is turned on.

The LC oscillating circuit 11 includes a capacitor C11 applied with a direct current voltage B1+ of 180V applied thereto through the resistor R11 and charged/discharged for the degaussing current, a coil L11 connected to the capacitor C11 in series for the degaussing current, and a diode D11 connected to the capacitor C11 in parallel for forming a path of the degaussing current.

The first trigger circuit 12 includes a capacitor C12 charged by the direct current B2+ of 12V applied thereto through the resistor R16 when the television set is turned on, resistors R14 and R15 for dividing the charging voltage of the capacitor C12, a transistor Q11 that is turned on/off in accordance with the voltage divided by the resistors R14 and R15, and resistors R12 and R13 for dividing the trigger voltage applied thereto through the zener diode ZD11 and the transistor Q11 in accordance with direct current B2+ and B3+ when the transistor Q11 is turned on and for supplying to the switching unit Q10.

The second trigger circuit 13 includes a capacitor C13 charged by the direct current voltage B2+ of 12V applied thereto through resistors R20 and R21 when the television set is turned on, and a transistor Q12 whose base receives charged voltage through the resistor R22, the grounded emitter, and the collector connected to the gate of the switching unit Q10 for receiving the direct current voltage B3+ of 12V applied thereto through the third trigger circuit 14.

The third trigger circuit 14 includes a transistor Q13 whose base receives the direct current voltage B2+ of 12V applied thereto through the resistor R19, the grounded emitter, and the collector for receiving the direct current voltage B3+ of 12V which is divided by the resistors R12 and R18.

Here, the magnitudes of the resistors R20 and R21 and the capacitor C13 are set so that the transistor Q12 or the second trigger circuit 13 is turned on after the operation of the LC oscillating circuit 11 is completed in accordance with the first trigger circuit 12, and the direct current voltage B3+ of 12V is applied thereto from the battery of the vehicle of the like.

The operation and effects of the degaussing circuit for a television set will now be explained with reference to the accompanying drawings.

To begin with, before the television set is turned on, the switching unit Q10, as shown in FIG. 4B, maintains a turned-off state. At this time, the transistors Q11 and Q12 of the first, second and third trigger circuits 12, 13, and 14 are turned-off. In addition, the battery voltage B3+ applied to the third trigger circuit 14 is applied to the gate of the switching unit Q10 through the resistors R18 and R17 as a trigger voltage, and the capacitor C11 maintains a discharged state.

In the above-mentioned state, when the television set is turned on at a time of a turning-on time PON, direct current voltage B1+ and B2+ are applied thereto from a flyback transformer. The capacitor C11 of the LC oscillating circuit 11, as shown in FIG. 4A, is charged by the voltage B1+. In addition, the transistor Q13 of the third trigger circuit 14 is turned on in accordance with a voltage B2+ applied thereto, and the trigger voltage applied to the gate of the switching unit Q10 in accordance with a voltage B3+ applied thereto from the battery is blocked.

Thereafter, the capacitor C12 of the first trigger circuit 12 is charged by the voltage B2+ applied thereto through the resistor R16, and the transistor Q11 is turned on at the time when the charging voltage reaches a turning-on voltage level of the transistor Q11 after a certain time is lapsed, and the trigger voltage divided by the resistors R13 and R132 is applied to the gate of the switching unit Q10.

Therefore, the switching unit Q10 is turned on, and the voltage charged in the capacitor C11 of the LC oscillating circuit 11 is discharged, and the degaussing current i5 is applied to the gate of the switching unit Q10 through the coil L11 and the capacitor C11. In addition, the capacitor C11 is charged in the reverse direction, so that the degaussing current i6 which is reverse to the degaussing direction of the degaussing current i5 is applied to the diode D11, the capacitor C11, and the coil L11. That is, the degaussing operation is performed for a time Ta until the degaussing current i5 and i6, which are alternately applied through the coil 111, are removed.

Here, since the time until the capacitor C13 of the second trigger circuit 13 is charged is previously set to be longer than the time until the capacitor C12 of the first trigger circuit 12 is charged, the capacitor C13 of the second trigger circuit 13 is charged for a certain time from the turning-on time PON of the television set to the time until the degaussing operation is completed. Therefore, after a delay time, while the degaussing operation is completed by the first trigger 12, the transistor Q12 is turned on at the time t2 that the charging voltage of the capacitor C13 reaches the turning voltage of the transistor Q12.

When the transistor Q12 is turned on, since the trigger voltage of the first trigger circuit 12 applied to the gate of the switching unit Q10 is blocked, the capacitor C11 of the LC oscillating circuit 11, as shown in FIG. 4A, is recharged by the voltage B1+ of 180V.

That is, since the television set is turned off after the operation of the corresponding units are performed, the current flowing through the resistor R11 is blocked, and the resistor R11 is not heated.

Thereafter, when the television set is turned off at the time POFF, since the voltages B1+ and B2+ are disconnected, the transistors Q11, Q12, and Q13 are turned off. As the transistors Q12 and Q13 are turned off, the voltage B3+ applied from the battery is applied to the gate of the switching unit Q10 through the resistors Q18 and R17 as a trigger voltage, and the switching unit Q10 is turned on.

Therefore, since the voltage charged in the capacitor C11 of the LC oscillating circuit 11 is charged/discharged, the degaussing operation is performed for a time Tb until the degaussing current i5 and i6 which is alternately flown through the coil L11 are removed.

As described above, the degaussing circuit for a television set according to the present invention is directed to preventing color blurring of picture by sequentially degaussing after the television set is turned on, thus improving the picture quality. In addition, the heating of the degaussing circuit can be prevented by turning off the switching unit for a certain time while the television set is turned on.

Although the preferred embodiment of the present invention have been disclosed for illustrative purposes, those skilled in the art will appreciate that various modifications, additions and substitutions are possible, without departing from the scope and spirit of the invention as described in the accompanying claims.

What is claimed is:

1. A degaussing circuit for a television set, comprising:

an LC oscillating circuit for receiving a first direct current voltage and for flowing a degaussing current;

switching means sequentially turned on in accordance with a turning on/off operation of a television set for enabling an oscillating operation of said LC oscillating circuit;

first trigger means for receiving a second direct current voltage and for enabling the LC oscillating circuit by turning on said switching means after a certain time is lapsed after the television set is turned on;

second trigger means for receiving said second direct current voltage for turning off the switching means when the LC oscillating circuit completes the degaussing operation in accordance with a control of said first trigger means when the television set is turned on; and third trigger means for receiving a third direct current voltage and for turning on the switching means when the television set is turned off, said third trigger means being blocked when the television set is turned on.

2. The circuit of claim 1, wherein said second trigger means includes:

a capacitor charged by said second direct current voltage applied thereto through a first resistor; and a transistor having the base for receiving a charging voltage through a second resistor, the emitter connected to the ground, and the collector connected to a gate of the switching means for receiving said third direct current voltage applied thereto through said third trigger means.

3. The circuit of claim 2, wherein the values of said first resistor and said capacitor are previously set so that said transistor can be turned on after the operation of said LC oscillating circuit corresponding to the first trigger means is completed.

4. The circuit of claim 1, wherein said third trigger means includes a transistor having the base for receiving said second direct current voltage through a first resistor, and the emitter connected to the ground, and the collector for receiving said third direct current voltage divided by a second and a third resistors.

5. The circuit of claim 1, wherein said third direct current voltage is a direct current voltage of 12V applied from the battery of vehicle or the like.

* * * * *